United States Patent
Ben-Haim (10) Patent No.: US 9,268,557 B2
(45) Date of Patent: Feb. 23, 2016

(54) WRAPPING COMPUTER SOFTWARE APPLICATIONS

(71) Applicant: International Business Machines Corporation, Armonk, NY (US)

(72) Inventor: Eldan Ben-Haim, Kiryat Ono (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/313,177

(22) Filed: Jun. 24, 2014

(65) Prior Publication Data

US 2015/0370553 A1 Dec. 24, 2015

(51) Int. Cl.
 *G06F 9/54* (2006.01)
 *G06F 9/44* (2006.01)

(52) U.S. Cl.
 CPC ... *G06F 8/68* (2013.01); *G06F 8/70* (2013.01)

(58) Field of Classification Search
 None
 See application file for complete search history.

(56) References Cited

U.S. PATENT DOCUMENTS

| 8,892,876 | B1 * | 11/2014 | Huang et al. | 713/165 |
| 2013/0091543 | A1 * | 4/2013 | Wade et al. | 726/1 |
| 2014/0137184 | A1 * | 5/2014 | Russello et al. | 726/1 |

OTHER PUBLICATIONS

U.S. Appl. No. 14/313,135 entitled "Intercepting Inter-Process Communications" filed Jun. 24, 2014.
Appendix P List of IBM Patents or Patent Applications Treated As Related, Jun. 24, 2014.

* cited by examiner

*Primary Examiner* — Andy Ho
*Assistant Examiner* — Abdou Seye
(74) *Attorney, Agent, or Firm* — Fusheng Xu (57) ABSTRACT

Wrapping a computer software application by unpackaging the computer software application into constituent components including a data file that includes a listing of any of the components, modifying the data file to include a reference to a library, where the library is configured to cause communications between the computer software application and a computer operating system to be intercepted and processed by instructions within the library when the computer software application is executed by a computer, and repackaging the computer software application to include the library and any of the components listed in the modified data file.

14 Claims, 5 Drawing Sheets

WRAPPING COMPUTER SOFTWARE APPLICATIONS

FIELD OF THE INVENTION

The present invention relates generally to computer application security, and more particularly, to wrapping a computer software application in order to intercept inter-process communications.

BACKGROUND OF THE INVENTION

In computing, inter-process communication (IPC) is a set of methods for the exchange of data among multiple threads in one or more processes. Processes may be running on one or more computers connected by a network. IPC methods are divided into methods for message passing, synchronization, shared memory, and remote procedure calls (RPC).

SUMMARY

In one aspect of the present invention, a method is provided for wrapping a computer software application, the method includes unpackaging, by one or more processors, a computer software application into a plurality of components including a data file that includes a listing of any of the components. The method further includes modifying, by one or more processors, the data file to include a reference to a library, wherein the library is configured to cause communications between the computer software application and a computer operating system to be intercepted and processed by instructions within the library when the computer software application is executed by a computer. The method further includes repackaging, by one or more processors, the computer software application to include the library and any of the components listed in the modified data file.

In other aspects of the invention, systems and computer program products embodying the invention are provided.

BRIEF DESCRIPTION OF THE SEVERAL VIEWS OF THE DRAWINGS

Aspects of the invention will be understood and appreciated more fully from the following detailed description taken in conjunction with the appended drawings in which.

DETAILED DESCRIPTION

Embodiments of the present invention recognize that in order to implement computer-related security mechanisms, it is often desirable to intercept inter-process communications between a computer-based application and the operating system or platform components of the computing environment in which the computer-based application is hosted. Embodiments of the present invention also recognize that such interceptions may be used to monitor application activity and implement policies that scrutinize and possibly modify such communications. For example, when an application requests to send data to another application, it may be desirable to check the data for viruses and prevent transmission of the data if they are found to include a virus. Embodiments of the present invention allow for wrapping a computer software application in order to intercept inter-process communications. Implementation of embodiments of the invention may take a variety forms, and exemplary implementation details are discussed subsequently with reference to the Figures.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
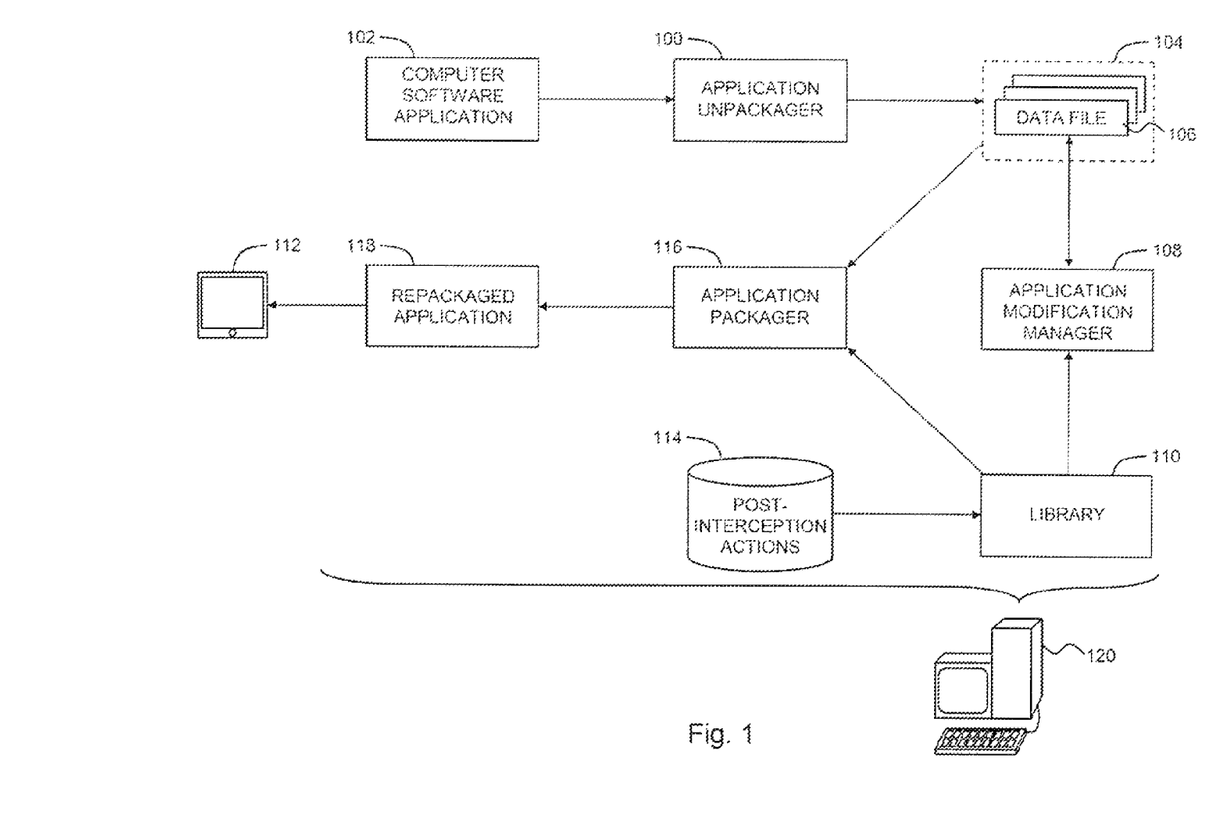
FIG. 1 is a simplified conceptual illustration of a system for wrapping a computer software application, constructed and operative in accordance with an embodiment of the invention.

Reference is now made to FIG. 1, which is a simplified conceptual illustration of a system for wrapping a computer software application, constructed and operative in accordance with an embodiment of the invention. In the system of FIG. 1, an application unpackager 100 is configured to unpackage a computer software application 102 into its constituent components 104, where components 104 include an application data file 106 that includes a listing of any, and preferably all, of components 104. Computer software application 102 may, for example, be an Apple iOS™ application archive file having an .ipa extension, where application data file 106 is the application's Mach-O file.

An application modification manager 108 is configured to modify application data file 106 to include a reference to a library 110, a copy of which application modification manager 108 preferably includes among components 104, where library 110 is configured to cause communications between computer software application 102 and a computer operating system to be intercepted and processed by instructions within library 110 when computer software application 102 is executed by a computer, such as a computer 112 running the Apple iOS™ operating system. Library 110 is configured to identify one or more predefined post-interception actions 114 that are associated with different types of such communications and apply the post-interception actions to the communications, which may include modifying the communications, such as by modifying data that are included in the communications or that are otherwise associated with the communications, forwarding the modified or unmodified communications to the intended recipient of the communications, such as a function or process, or withholding the communications from its intended recipient.

An application packager 116 is configured to create a repackaged computer software application 118 to include library 110 and any, and preferably all, of components 104 such as are listed in application data file 106 after it has been modified by application modification manager 108.

Any of the elements shown in FIG. 1 are preferably implemented using a computer, such as a computer 120 running the Apple OS X™ operating system and configured with Apple Xcode™ integrated development environment (IDE) software, by implementing any of the elements of FIG. 1 in computer hardware and/or in computer software.

Figure 2:
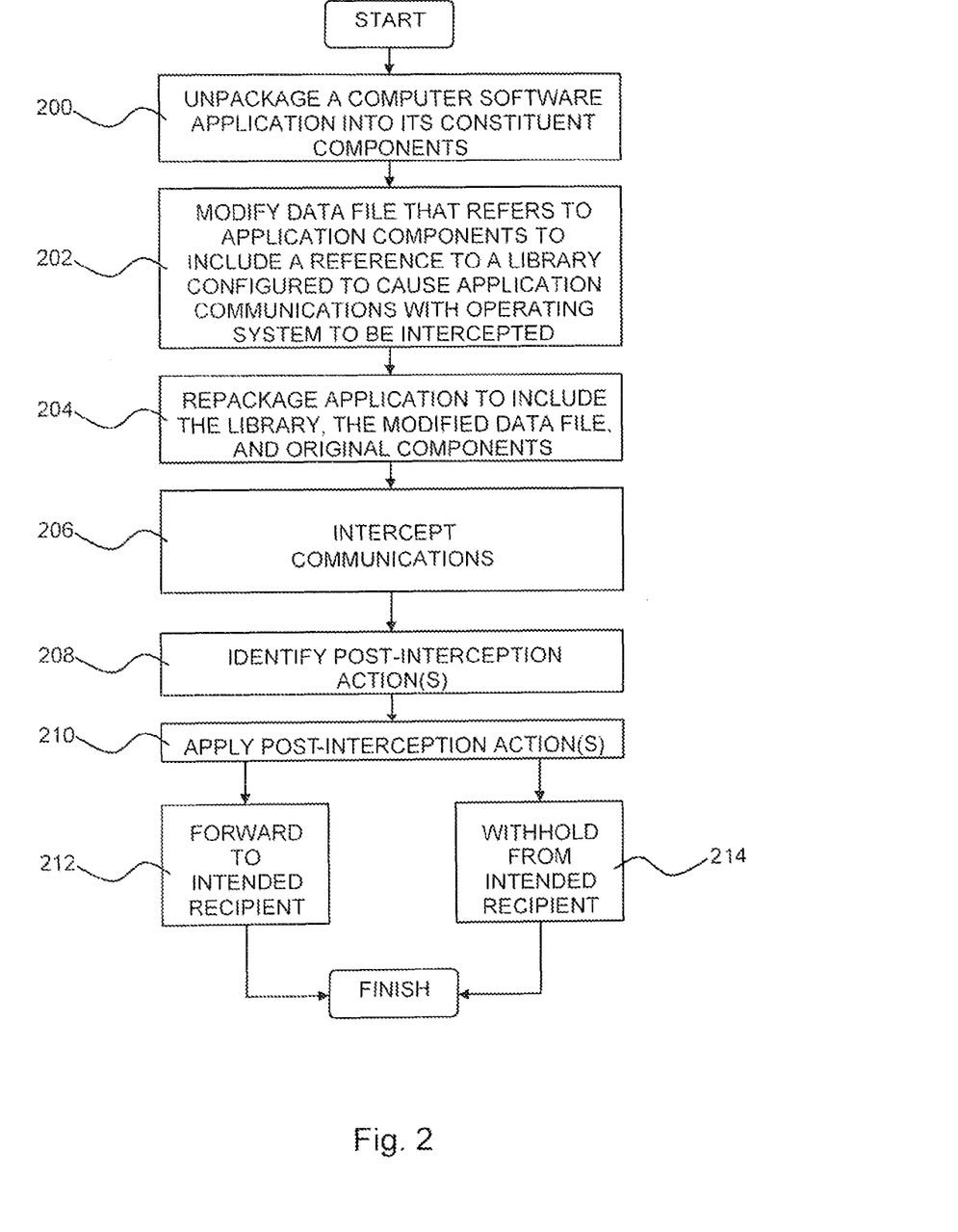
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2, a computer software application is unpackaged into its constituent components (step 200), where the components include an application data file that includes a listing of any, and preferably all, of the components. The application data file is modified to include a reference to a library that is configured to cause communications between the computer software application and a computer operating system to be intercepted and processed by instructions within the library (step 202). The computer software application is repackaged to include the library and any, and preferably all, of the components of the original computer software application (step 204). When the repackaged computer software application is executed by a computer, and communications between the computer software application and a computer operating system are intercepted (step 206), one or more predefined post-interception actions that are associated with the communications are identified (step 208). The identified post-interception actions are applied to the communications (step 210), which may include modifying the communications, such as by modifying data received along with the communications or otherwise associated with the communications, forwarding the modified or unmodified communications to the intended recipient of the communications, such as a function or process (step 212), or withholding the communications from its intended recipient (step 214).

The system of FIG. 1 and method of FIG. 2 may be illustrated by the following exemplary scenario where the following steps are performed in the context of a computer software application developed for the Apple iOS™ operating system.

A dynamic library file "A" includes a constructors section that is configured to be invoked by a host operating system when a computer software application that includes dynamic library file "A" is executed within the operating system environment. Dynamic library file "A" is configured for use by the Apple Xcode™ integrated development environment (IDE) with computer software applications written in the Objective-C™ programming language. The constructors are configured to cause the interception of communications between a computer software application, during its execution, that includes dynamic library file "A" and its host operating system.

The component files of an Apple iOS™ application archive (i.e., an .ipa file) of a computer software application are extracted.

Dynamic library file "A" is added to the component files of the extracted application archive.

The load-command sections are located within the application's binary Mach-O file, into which is added a load-command section that refers to the copy of dynamic library file "A". The file path is specified within the added load-command section using an @executable_path prefix used in iOS™ to identify dynamic library paths relative to the path of the application executable file.

The application component files including the dynamic library file "A" are repackaged into a new .ipa file and code-signed as required.

When the new .ipa file is executed, the dynamic library file "A" is loaded by the iOS™ loader, and its constructors are invoked. The constructors cause the following to occur:

- The -[UIApplication setDelegate:] function of the Apple Cocoa Touch™ framework is hooked using method swizzling. This function is called by applications early in their lifecycle to receive notifications from the operating system on application startup and shutdown.
- The hooked implementation receives the application delegate provided by the wrapped application and hooks some of the notifications it receives, such as -[UIApplicationDelegate applicationWillEnterForground:], allowing for a response by performing late initialization tasks.
- During its initialization, dynamic library file "A" hooks calls to various operating system services such as filesystem APIs, data transfer APIs, and communication APIs to allow for related post-interception actions to be performed.

Figure 3:
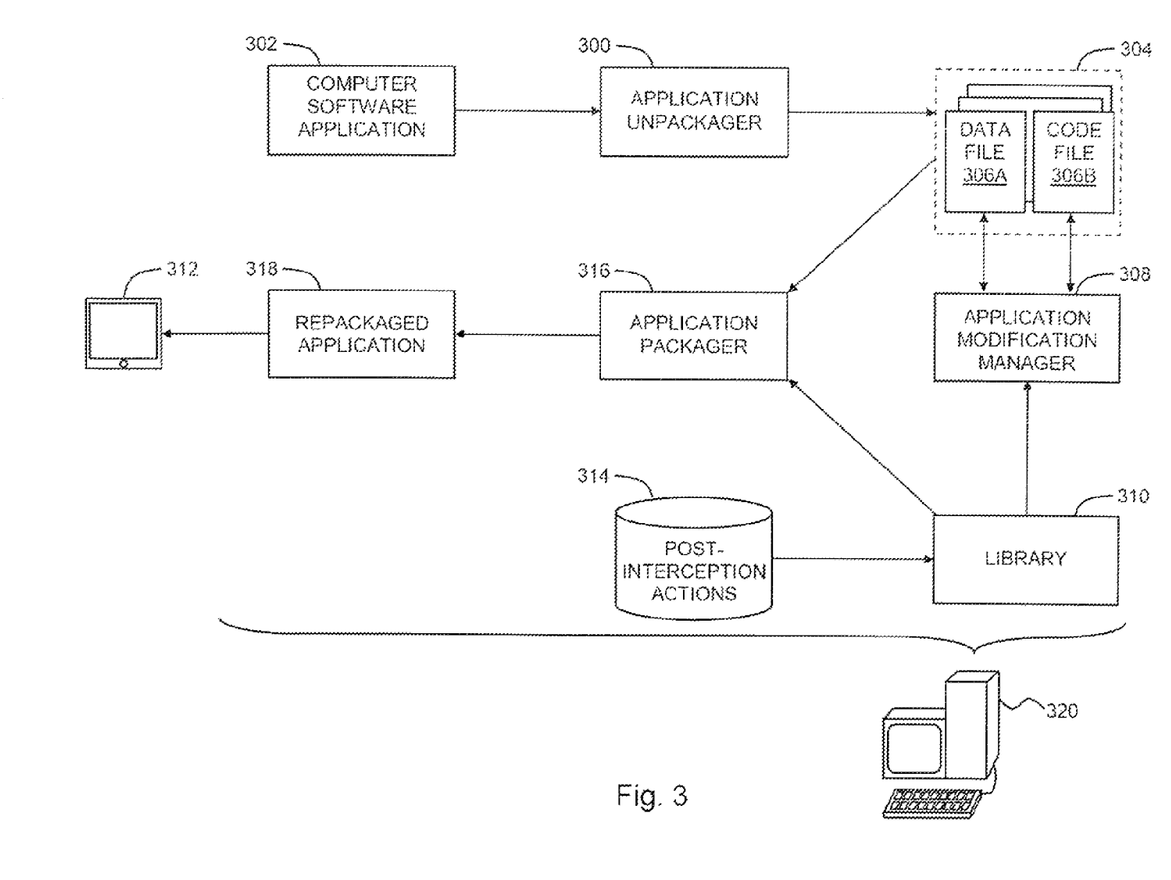
FIG. 3 is a simplified conceptual illustration of a system for wrapping a computer software application, constructed and operative in accordance with another embodiment of the invention.

Reference is now made to FIG. 3, which is a simplified conceptual illustration of a system for wrapping a computer software application, constructed and operative in accordance with another embodiment of the invention. In the system of FIG. 3, an application unpackager 300 is configured to unpackage a computer software application 302 into its constituent components 304, where components 304 include a data file 306A that includes a listing of any, and preferably all, of components 304, as well as a code file 306B that includes executable instructions of computer software application 302. Computer software application 302 may, for example, be a Google Android™ application archive file having an .apk extension, where data file 306A is the application's manifest file, and where code file 306B includes bytecode configured to be executed by the Dalvik™ virtual machine that is employed by the Google Android™ operating system.

An application modification manager 308 is configured to read data file 306A to identify components of computer software application 302, such as its permissions, application classes, activity classes, intent classes, and service classes, and modify data file 306A to include any permissions that may be required by a library 310, a copy of which application modification manager 308 preferably includes among components 304. Library 310 is configured to cause communications between computer software application 302 and a computer operating system to be intercepted and processed by instructions within library 310 when computer software application 302 is executed by a computer, such as a computer 312 running the Google Android™ operating system. Library 310 is configured to identify one or more predefined post-interception actions 314 that are associated with different types of such communications and apply the post-interception actions to the communications, which may include modifying the communications, such as by modifying data that are included in the communications or that are otherwise associated with the communications, forwarding the modified or unmodified communications to the intended recipient of the communications, such as a function or process, or withholding the communications from its intended recipient.

Application modification manager 308 is also configured to disassemble code file 306B, such as by disassembling Dalvik™ bytecode into SMALI representation using the SMALI disassembler that is publicly available, and modify the SMALI representations of the application classes, activity classes, intent classes, and service classes identified in the data file 306A such that when methods or functions in code file 306B that involve communication with the operating system are invoked they instead invoke corresponding methods or functions included in library 310 for processing such intercepted communications as described hereinabove.

An application packager 316 is configured to repackage computer software application 302 to create a repackaged computer software application 318 to include library 310, one or more Dalvik™ Executable Format (DEX) files created from the modified SMALI representations, a recompiled manifest including the modifications to data file 306A, and any, and preferably all, other components 304, such as by rebuilding an .apk file therefrom.

Any of the elements shown in FIG. 3 are preferably implemented using a computer, such as a computer 320 running the Microsoft Windows™ operating system and configured with the Google Android™ system development kit (SDK), by implementing any of the elements of FIG. 3 in computer hardware and/or in computer software.

Figure 4:
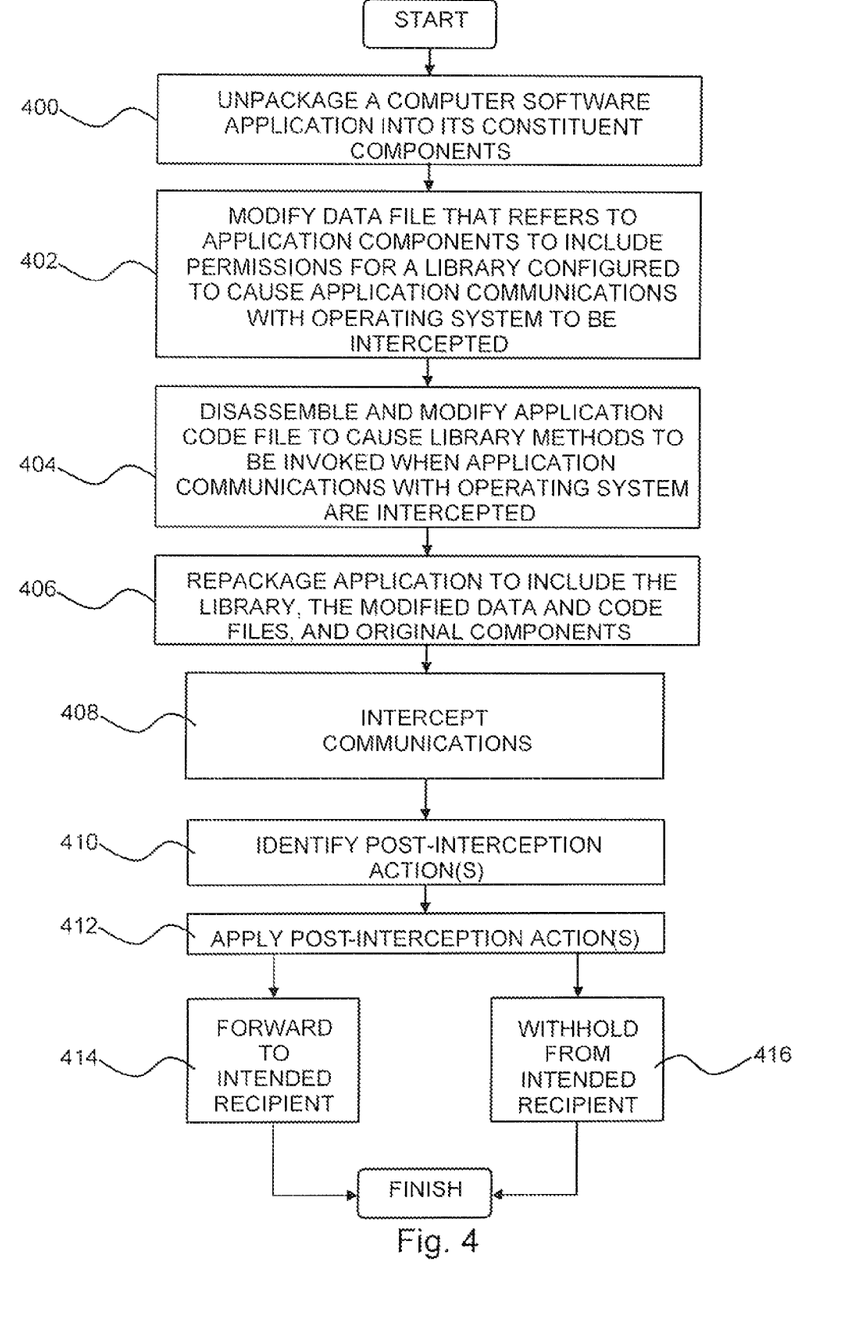
FIG. 4 is a simplified flowchart illustration of an exemplary method of operation of the system of FIG. 3, operative in accordance with an embodiment of the invention.

Reference is now made to FIG. 4, which is a simplified flowchart illustration of an exemplary method of operation of the system of FIG. 3, operative in accordance with an embodiment of the invention. In the method of FIG. 4, a computer software application is unpackaged into its constituent components (step 400), where the components include a data file that includes a listing of any, and preferably all, of the components, as well as a code file that includes executable instructions of the computer software application. The data file is modified to include any permissions that may be required by a library that is configured to cause communications between the computer software application and a computer operating system to be intercepted and processed by instructions within the library (step 402). The code file is disassembled, modified such that when methods or functions in the code file that involve communication with the operating system are invoked they instead invoke corresponding method or functions included in library, and recompiled (step 404). The computer software application is repackaged to include the library and any, and preferably all, of the original and modified components of the computer software application (step 406). When the repackaged computer software application is executed by a computer, and communications between the computer software application and a computer operating system are intercepted (step 408), one or more predefined post-interception actions that are associated with the communications are identified (step 410). The identified post-interception actions are applied to the communications (step 412), which may include modifying the communications, such as by modifying data received along with the communications or otherwise associated with the communications, forwarding the modified or unmodified communications to the intended recipient of the communications, such as a function or process (step 414), or withholding the communications from its intended recipient (step 416).

The system of FIG. 3 and method of FIG. 4 may be illustrated by the following exemplary scenario, where the following steps are performed in the context of a computer software application developed for the Google Android™ operating system.

A set of Google Android™ Java™ classes is created, where the classes include static functions that are called during application lifecycle events, such as application launch, activity launch, and service startup. These static functions are configured to implement the interception of communications between a computer software application during its execution and its host operating system. Where implementing the interception of such communications requires calling into native code, the relevant code is compiled into a set of native shared object libraries. The Java™ classes are then compiled into Dalvik™ bytecode and then disassembled into SMALI representation. The set of SMALI representations for the classes combined with the required shared object libraries is then packaged, along with any required assets and resources, into a package "A".

The component files of an Google Android™ application archive (i.e., an .apk file) of a computer software application are extracted.

Dalvik™ bytecode in the extracted archive is disassembled into SMALI representation.

The contents of package "A", the SMALI representations, shared object libraries, resources, and assets are added to the component files of the extracted application archive.

The application manifest from the extracted application archive is read to identify it components, including application classes, activity classes, intent receiver classes, and service classes.

The manifest is updated to include any new permissions that may be required by package "A".

The SMALI representations of the classes identified in the manifest are modified such that when methods of these classes that involve communication with the operating system are invoked they instead invoke corresponding methods included in package "A" for processing such intercepted communications.

A Dalvik™ Executable Format (DEX) file is reassembled from the modified SMALI representations.

The manifest file and any related resource files are recompiled.

An .apk file is packaged using the above files, including package "A", and is code-signed as required.

When the .apk file is executed, as activities, services, receivers, and the application object itself are created, application lifecycle callbacks defined in package "A" are invoked by the modified code to put in place the communications interception mechanisms to allow for related post-interception actions to be performed.

Figure 5:
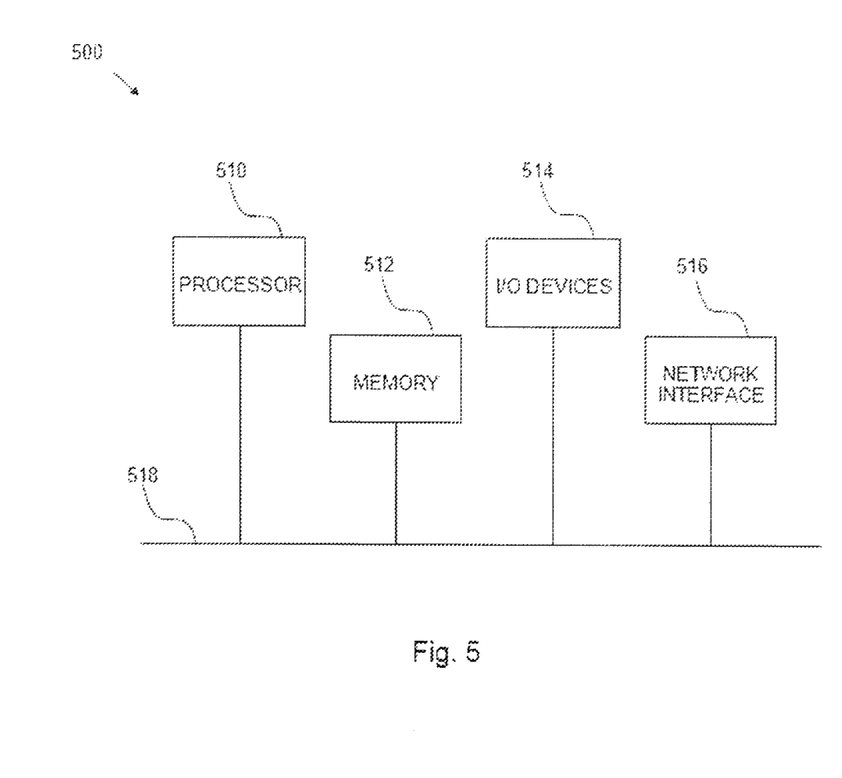
FIG. 5 is a simplified block diagram illustration of an exemplary hardware implementation of a computing system, constructed and operative in accordance with an embodiment of the invention.

Referring now to FIG. 5, block diagram 500 illustrates an exemplary hardware implementation of a computing system, in accordance with which one or more components/methodologies of the invention (e.g., components/methodologies described in the context of FIGS. 1-4) may be implemented, according to an embodiment of the invention.

As shown, the techniques for controlling access to at least one resource may be implemented, in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for wrapping a computer software application, the method comprising:
   unpackaging, by one or more processors, a computer software application into a plurality of components including a data file that includes a listing of any of the components;
   modifying, by one or more processors, the data file to include a reference to a library, wherein the library is configured to cause communications between the computer software application and a computer operating system to be intercepted and processed by instructions within the library when the computer software application is executed by a computer; and repackaging, by one or more processors, the computer software application to include the library and any of the components listed in the modified data file;

wherein the step of modifying, by one or more processors, the data file to include a reference to the library further comprises modifying the data file to include any permissions required by the library;

wherein the instructions within the library comprise instructions to:

identify a predefined post-interception action that is associated with a type of communication; and apply the predefined post-interception action to an intercepted communication of the type.

2. The method of claim 1, wherein the predefined post-interception action includes modifying the intercepted communication.

3. The method of claim 1, wherein the predefined post-interception action includes forwarding the intercepted communication to a function that is an intended recipient of the intercepted communication.

4. The method of claim 1, wherein the plurality of components includes a code file that includes executable instructions of the computer software application, and wherein the modifying further comprises:

disassembling the code file into disassembled instructions;

modifying the disassembled instructions to cause an invocation of a method or function in the code file to invoke a corresponding method or function in the library; and reassembling the modified disassembled instructions into a modified code file.

5. The method of claim 4, wherein the step of repackaging, by one or more processors, the computer software application to include the library and any of the components listed in the modified data file comprises:

repackaging, by one or more processors, the computer software application to include the library, any of the components listed in the modified data file, and the modified code file.

6. A computer program product for wrapping a computer software application, the computer program product comprising:

one or more computer readable storage media and program instructions stored on the one or more computer readable storage media, the program instructions comprising:

program instructions to unpackage a computer software application into a plurality of components including a data file that includes a listing of any of the components;

program instructions to modify the data file to include a reference to a library, wherein the library is configured to cause communications between the computer software application and a computer operating system to be intercepted and processed by instructions within the library when the computer software application is executed by a computer; and program instructions to repackage the computer software application to include the library and any of the components listed in the modified data file;

wherein the program instructions to modify the data file to include a reference to the library further comprise program instructions to modify the data file to include any permissions required by the library;

wherein the instructions within the library comprise instructions to:

identify a predefined post-interception action that is associated with a type of communication; and apply the predefined post-interception action to an intercepted communication of the type.

7. The computer program product of claim 6, wherein the predefined post-interception action includes modifying the intercepted communication.

8. The computer program product of claim 6, wherein the predefined post-interception action includes forwarding the intercepted communication to a function that is an intended recipient of the intercepted communication.

9. The computer program product of claim 6, wherein the plurality of components includes a code file that includes executable instructions of the computer software application, and wherein the program instructions to modify further comprise program instructions, stored on the one or more computer readable storage media, to:

disassemble the code file into disassembled instructions;

modify the disassembled instructions to cause an invocation of a method or function in the code file to invoke a corresponding method or function in the library; and reassemble the modified disassembled instructions into a modified code file.

10. The computer program product of claim 9, wherein the program instructions to repackage the computer software application to include the library and any of the components listed in the modified data file comprise program instructions to:

repackage the computer software application to include the library, any of the components listed in the modified data file, and the modified code file.

11. A computer system for wrapping a computer software application, the computer system comprising:

one or more computer processors, one or more computer readable storage media, and program instructions stored on the computer readable storage media for execution by at least one of the one or more processors, the program instructions comprising:

program instructions to unpackage a computer software application into a plurality of components including a data file that includes a listing of any of the components;

program instructions to modify the data file to include a reference to a library, wherein the library is configured to cause communications between the computer software application and a computer operating system to be intercepted and processed by instructions within the library when the computer software application is executed by a computer; and program instructions to repackage the computer software application to include the library and any of the components listed in the modified data file;

wherein the program instructions to modify the data file to include a reference to the library further comprise program instructions to modify the data file to include any permissions required by the library;

wherein the instructions within the library comprise instructions to:

identify a predefined post-interception action that is associated with a type of communication; and apply the predefined post-interception action to an intercepted communication of the type.

12. The system of claim 11, wherein the predefined post-interception action includes forwarding the intercepted communication to a function that is an intended recipient of the intercepted communication.

13. The system of claim 11, wherein the plurality of components includes a code file that includes executable instructions of the computer software application, and wherein the program instructions to modify further comprise program instructions, stored on the one or more computer readable storage media, to:
- disassemble the code file into disassembled instructions;
- modify the disassembled instructions to cause an invocation of a method or function in the code file to invoke a corresponding method or function in the library; and
- reassemble the modified disassembled instructions into a modified code file.

14. The system of claim 13, wherein the program instructions to repackage the computer software application to include the library and any of the components listed in the modified data file comprise program instructions to:
- repackage the computer software application to include the library, any of the components listed in the modified data file, and the modified code file.

* * * * *